(12) United States Patent
Sauerwald

(10) Patent No.: US 12,703,292 B2
(45) Date of Patent: Aug. 11, 2026

(54) STRAP ASSEMBLY FOR SECURING A WHEEL OF A VEHICLE TO A BED OF A TRANSPORT

(71) Applicant: SKELLEN ENTERPRISES LLC, Harleysville, PA (US)

(72) Inventor: Kevin Scott Sauerwald, Harleysville, PA (US)

(73) Assignee: SKELLEN ENTERPRISES LLC

( * ) Notice: Subject to any disclaimer, the term of this patent is extended or adjusted under 35 U.S.C. 154(b) by 733 days.

(21) Appl. No.: 17/444,748

(22) Filed: Aug. 9, 2021

(65) Prior Publication Data

US 2022/0041093 A1 Feb. 10, 2022

Related U.S. Application Data

(60) Provisional application No. 63/062,445, filed on Aug. 7, 2020.

(51) Int. Cl.
*B60P 7/08* (2006.01)

(52) U.S. Cl.
CPC .................................. *B60P 7/0846* (2013.01)

(58) Field of Classification Search
CPC ..................................................... B60P 7/0846
USPC .............................................. 410/10, 20, 21
See application file for complete search history.

(56) References Cited

U.S. PATENT DOCUMENTS 1,424,957 A * 8/1922 Van Tilburg ............ B60P 3/075 410/20
1,770,798 A * 7/1930 Nicholson ............... B60P 3/075 410/20
1,860,565 A * 5/1932 Berger .................... B60P 3/073 410/9
1,937,769 A * 12/1933 Lute .......................... B60T 3/00 410/20
1,990,562 A * 2/1935 Otis ........................ B60P 3/075 410/67
2,035,772 A * 3/1936 Tobin ...................... B60P 3/073 410/20
2,046,855 A * 7/1936 Tobin ...................... B60P 3/073 410/20
2,047,503 A * 7/1936 Wilson .................... B60P 3/075 193/41
2,055,829 A * 9/1936 Tobin ...................... B60P 3/075 410/20

(Continued)

FOREIGN PATENT DOCUMENTS

GB 715712 A * 9/1954 ........... B61D 45/008

*Primary Examiner* — Hilary L Gutman

(74) *Attorney, Agent, or Firm* — Pearson IP; Loren Donald Pearson

(57) ABSTRACT

A strap assembly can hold a tire of a vehicle to a bed of a transport. A securing segment of the strap assembly goes around a tire being held. A first support arm of the securing segment is placed over an outer face of the tire. A second support arm of the securing segment is placed over the inner face of the tire. A tread arm that is parallel to the first and second support arms (when the securing segment is in an unfolded potion) can lie against the tread of the tire. Four arms (two from each support arm) are gathered and then connected by a strap to the bed of the vehicle. A tensioner can be included in the strap to secure the tire to the bed. Four strap assemblies can be attached, one to each tire, respectively, to secure a vehicle to the bed of the transport.

18 Claims, 9 Drawing Sheets

(56) References Cited

U.S. PATENT DOCUMENTS 2,372,967 A 4/1945 Martin
2,521,088 A * 9/1950 Phelps .................. B65D 85/68 206/335
3,462,945 A * 8/1969 Barber .................. F16G 15/06 294/82.35
4,096,807 A 6/1978 Woodward
4,371,298 A * 2/1983 Van Iperen ............ B60P 3/073 410/23
4,479,746 A * 10/1984 Huber .................. B63B 25/20 410/23
4,492,403 A * 1/1985 Blomgren ............ A61G 3/0808 296/68.1
4,611,961 A * 9/1986 Van Iperen ............ B60P 3/075 294/157
4,786,223 A * 11/1988 Crissy .................. B60P 3/075 410/20
4,836,726 A * 6/1989 Robertson ............ B61D 45/004 410/20
4,850,769 A 7/1989 Matthews
4,960,353 A * 10/1990 Thorndyke .......... B61D 45/001 410/20
4,993,898 A * 2/1991 Klahold .............. B61D 45/001 410/12
5,160,223 A * 11/1992 Seitz .................. B60P 3/077 410/20
5,241,856 A * 9/1993 Petersen .............. G01M 17/04 73/115.07
5,330,148 A * 7/1994 Floyd .................. B60P 3/075 410/23
5,391,030 A 2/1995 Lee
5,452,973 A 9/1995 Arvin
5,584,622 A * 12/1996 Dickerson, Sr. ........ B60P 3/075 410/20
5,603,591 A 2/1997 McLellan
5,800,106 A 9/1998 Miller
5,876,167 A 3/1999 Selby
5,915,900 A 6/1999 Boltz
5,941,665 A * 8/1999 Dahlin .................. B60P 3/075 410/20
6,017,174 A 1/2000 Ross et al.
6,039,521 A 3/2000 Sullivan
6,139,231 A * 10/2000 Kissel .................. B60P 3/075 410/20
6,152,664 A 11/2000 Dew et al.
6,328,511 B1 * 12/2001 Cardona ................ B60P 3/075 410/20
D494,919 S * 8/2004 Davis .......................... D12/223
6,783,311 B2 8/2004 Sauerwald
6,808,346 B2 10/2004 Zhan et al.
6,896,458 B1 5/2005 Romero
7,025,545 B1 * 4/2006 Robison ................ B60P 3/075 410/20
7,249,920 B2 7/2007 Early et al.
7,270,507 B1 * 9/2007 Jernigan ................ B60P 7/12 410/97
7,390,155 B1 6/2008 Diaz et al.
7,901,168 B2 3/2011 Fa-Kouri
8,182,180 B2 * 5/2012 Woodford ................ B60P 7/08 410/20
8,272,821 B2 9/2012 Digman
8,882,417 B2 11/2014 Sauerwald
11,805,863 B1 * 11/2023 Decker .............. A45C 13/1069
2001/0046424 A1 11/2001 McDonald
2002/0006317 A1 1/2002 Hofmann et al.
2005/0276658 A1 * 12/2005 Silva ...................... F16G 15/06 403/154
2009/0269156 A1 10/2009 Siegenthaler
2011/0211930 A1 9/2011 Digman

* cited by examiner 9
32
8
8A

STRAP ASSEMBLY FOR SECURING A WHEEL OF A VEHICLE TO A BED OF A TRANSPORT

CROSS-REFERENCE TO RELATED APPLICATIONS

This application claims the benefit of U.S. Provisional Application No. 63/062,445, filed Aug. 7, 2020, which is hereby incorporated by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to straps for securing a wheeled vehicle to a bed of a transport.

Description of the Related Art

A flatbed truck is an example of a transport that can carry wheeled vehicles. A typical bed of a flatbed truck is rectangular. The bed has a tiedown at each corner. Straps are used to tie a vehicle being carried to a tiedown.

A tiedown system can be evaluated by measuring the strength of the connection, the slack in the connection, and the ease of connecting and disconnecting a vehicle from the bed.

FIG. 9 shows a strap according to the prior art for connecting a tire 111 of a vehicle 110 to a bed 100 of a transport. A first tie-down 101A is disposed before the tire 111 and a second tie-down 101B is disposed behind the tire 111. A first hook 5A connects to the tiedown 101A. The first hook 5A connects to a tensioning arm 8. A handle ratchet 20 tightens the tensioning arm 8. A D-ring 4 connects to the tensioning arm 8. An inner strapping leg 1A and an outer strapping leg 1B attach to the D-ring 4. A support arm 3 connects the inner strapping leg 1A and the outer strapping leg 1B and spans the tread of the tire 111. The inner strapping leg 1A and the outer strapping leg 1B rejoin at a second D-ring, which is not visible in FIG. 10. The second D-ring connects to a second tensioning arm, which is not visible in FIG. 10. The second tensioning arm connects to a second hook 5B. The second hook 5B connects to the second tie-down 101B on the bed 100.

The strap shown in FIG. 9 has several shortcomings. First, the strap requires two tiedowns 101A and 101B per tire 111. Second, to connect and remove the strap, the strap must be connected and tensioned to the bed twice: once for each end.

BRIEF SUMMARY OF INVENTION

A strap assembly can hold a tire of a vehicle being transported. The strap assembly includes a securing segment. The securing segment includes a first support arm for placing over an outer face of the tire. The first support arm has a first end and a second end. A second support arm is for placing over an inner face of the tire. The second support arm has a first end and a second end. The first outer segment is connected to the first end of the first support arm. A second outer segment is connected to the second end of the second support arm. A third outer segment is connected to the first end of the second support arm. A fourth outer segment is connected to the second end of the second support arm. A first inner segment is connected to the first end of the first support arm. A second inner segment is connected to the second end of the first support arm. A third inner segment is connected to the first end of the second support arm. The third inner segment is further connected to the first inner segment. A fourth inner segment is connected to the second end of the second support arm. Thed fourth inner segment is further connected to the second inner segment. A first fastener is connected to the first outer segment. A second fastener being connected to the second outer segment; a third fastener being connected to the third outer segment; and a fourth fastener being connected to the fourth outer segment.

Implementations may include one or more of the following features. In the strap assembly, the first support arm and the second support arm are parallel to each other. The first inner segment can be flexible. The second inner segment can be flexible. The third inner segment can be flexible. The fourth inner segment can be flexible. At least one of, and perhaps all of, the following parts may be made from webbing: the first support arm, the second support arm, the first outer segment, the second outer segment, the third outer segment, the fourth outer segment, the first inner segment, the second inner segment, the third inner segment, and the fourth inner segment. At least one, and up to all, of the first fastener, the second fastener, the third fastener, and the fourth fastener can be a ring. The ring can be a D-ring.

In accordance with the objects of the invention, the third inner segment can have a length less than a radius of the tire. Likewise, the fourth inner segment can have a length less than a radius of the tire.

The securing segment further cam includes a tread arm for overlying. At least partially, a tread of the tire, the tread arm having a first end and a second end, the first end of the tread arm being connected to the first inner segment and the third inner segment, and the second end of the tread arm being connected to the second inner segment and the fourth inner segment.

The first support arm can be parallel to the second support arm when unfolded. The first support arm and the second support arm are parallel to the tread arm when unfolded.

Any of the inner segments (e.g., the first inner segment; the second inner segment; the third inner segment; and the fourth inner segment) can be flexible.

The tread arm can have a height. The height of the tread arm can be greater than a diameter of an axle connected to the tire.

The tread arm can have a width The width of the tread arm can approximately equal to a width of the tread of the tire. In this case, approximately equal should be consider from five-tenths to one-and-five-tenths times (0.5-1.5×) the width of the tire tread.

The strap assembly may include: a strap having a first end and a second end. The first end of the strap can be connected to the first fastener, the second fastener, the third fastener, and the fourth fastener. The second end of the strap can have a fastener for connecting to a bed of a transport. The first end of the strap can be connected to a securing-segment fastener. The securing-segment fastener can be a hook. The hook can be a safety hook having a spring-loaded shackle latch.

The strap can include the following: a tensioning segment forming the first end of the strap; a connecting segment forming the second end of the strap; and a tensioner interconnecting the tensioning segment and the connecting segment, the tensioner increasing and decreasing a length of the strap.

The invention includes a method for securing a tire of a vehicle to a bed of a transport. The method may include the following steps. The first step is providing a strap assembly. The next step is placing the securing segment over the tire. Placing the securing segment over the tire includes the following sub steps: placing the first support arm over the outer face of the tire, placing the second support arm over the inner face of the tire with the second support arm being above an axle connected to the tire, placing at least a portion of the first inner segment over a tread of the tire, placing at least a portion of the second inner segment over the tread of the tire, placing at least a portion of the third inner segment over the tread of the tire, and placing at least a portion of the fourth inner segment over the tread of the tire.

The method can further include the following steps: after placing the securing segment, securing a first end of a strap to the first fastener, the second fastener, the third fastener, and the fourth fastener of the securing segment; and securing a second end of the strap to the bed of the transport.

DETAILED DESCRIPTION OF THE INVENTION

A preferred embodiment of a strap can secure a wheel of a vehicle to one tiedown of a bed of transport. FIGS. 1A-1E show components of the preferred embodiment of the strap.

Figures 1A, 1B:
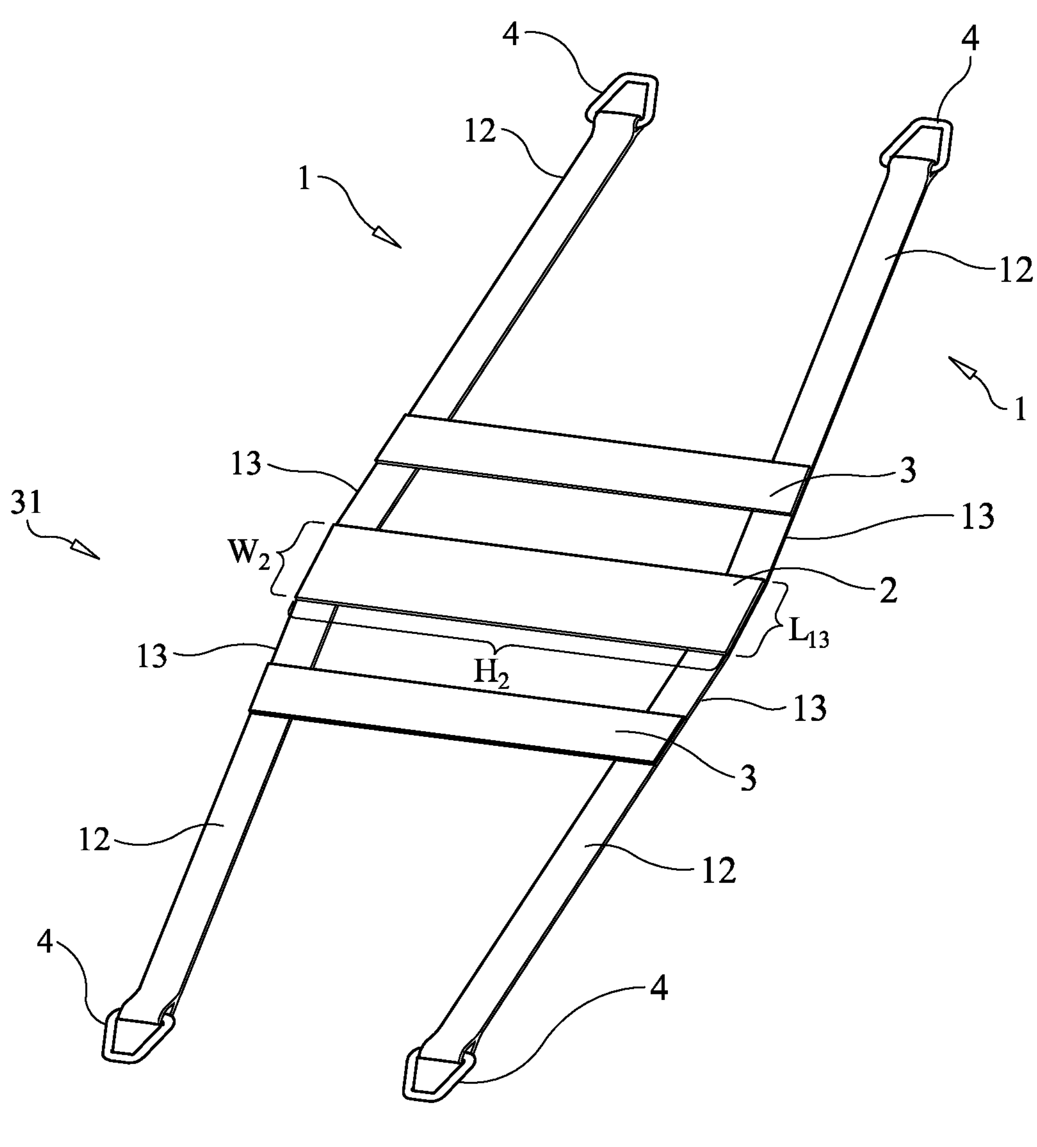
FIG. 1A is a diagrammatic plan view of a tire-securing segment of a strap according to the invention.
FIG. 1B is a diagrammatic plan view of a tensioning arm of the strap according to the invention.

FIG. 1A shows a tire-securing segment 31. A tread arm 2 will overlie a portion of a tread of a tire when installed. The tread arm 2 is rectangular. A height $h_2$ of the tread arm 2 is at least as tall as a diameter of an axle connected to the tire. The height $h_2$ of the tread arm 2 is not greater than half of the circumference of the tire. The width $w_2$ of the tread arm 2 is approximately equal to a width of the tire. Two strapping legs 1 are connected to the tread arm 2 with one strapping leg 1 being connected to a top edge of the tread arm 2 and the other strapping leg 1 being connected to a bottom edge of the tread arm 2. A D-ring 4 is connected to each end of each of the strapping legs 1. Two support arms 3 connect the strapping legs 1. The support arms 3 are parallel to each other and the tread arm 2. The support arms 3 bisect the strapping legs 1 to define four inner segments 13 and four outer segments 12 of the strapping legs 1. The inner segments 13 are the portion of the strapping legs 1 between the tread arm 2 and the support arm 3. The outer segments are the portion of the strapping legs 1 between the support arm 3 and the D-ring 4. The length of the inner segment $I_{13}$ is less than the radius of the tire.

FIG. 1B shows a preferred embodiment of a tensioning segment 32 of the strap. The tensioning segment includes a tensioning arm 8 and a safety hook 9 at one end of the tensioning arm 8.

Figure 1C:
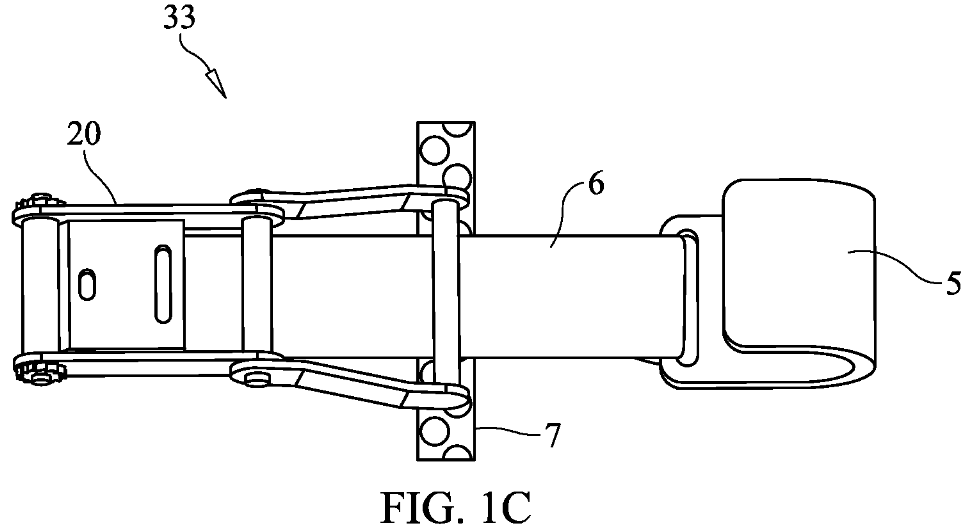
FIG. 1C is a diagrammatic plan view of a connector arm of the strap according to the invention.
Figure 1D:
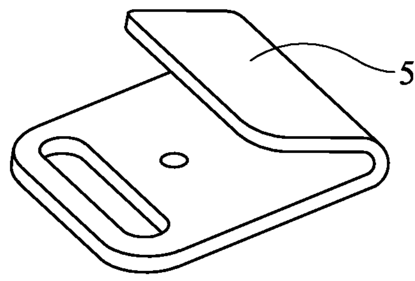
FIG. 1D is a diagrammatic perspective view of a flat hook of the strap according to the invention.
Figure 1E:
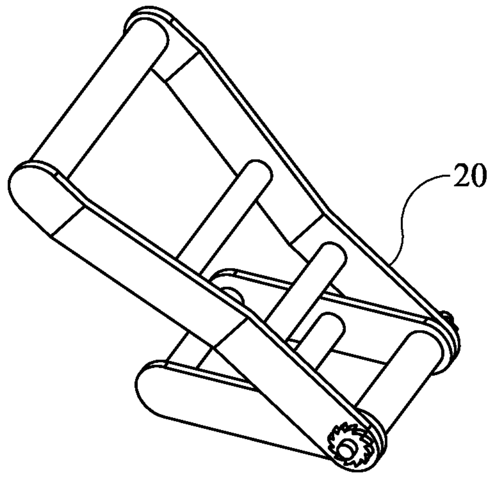
FIG. 1E is a diagrammatic perspective view of a handle ratchet of the strap according to the invention.
Figure 2:
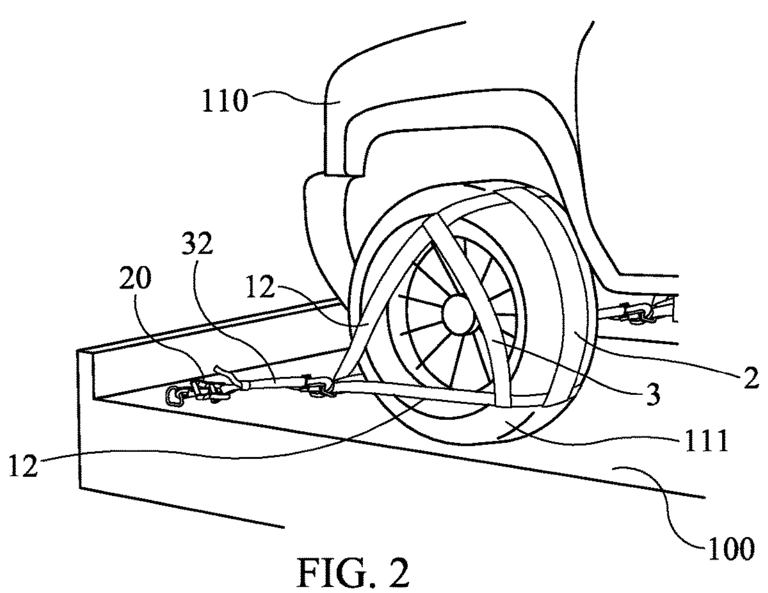
FIG. 2 is a photograph showing a left rear perspective view of a first strap according to the invention in which the strap is securing a front driver-side tire to a bed of a transport.
Figure 3:
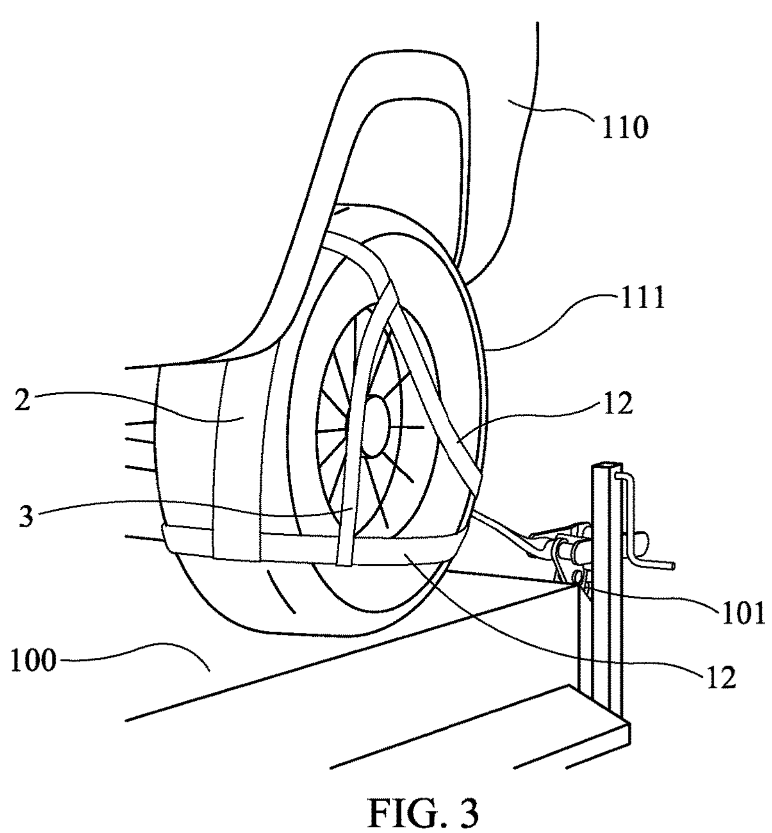
FIG. 3 is a photograph showing a right front perspective view of a second strap according to the invention in which the second strap is securing a rear driver-side tire to the bed of the transport.
Figure 4:
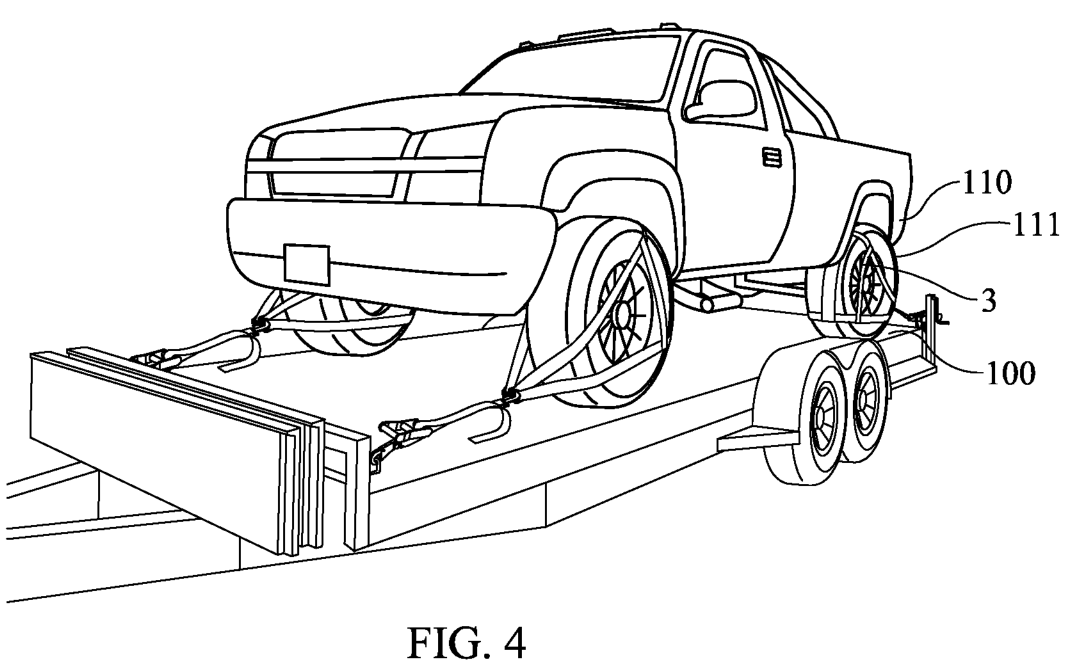
FIG. 4 is a photograph showing a left front perspective view of a first strap and a second strap in which the first strap is securing a front driver-side tire to a bed of a transport and the second strap is securing a rear driver-side tire to the bed of the transport.
Figure 5:
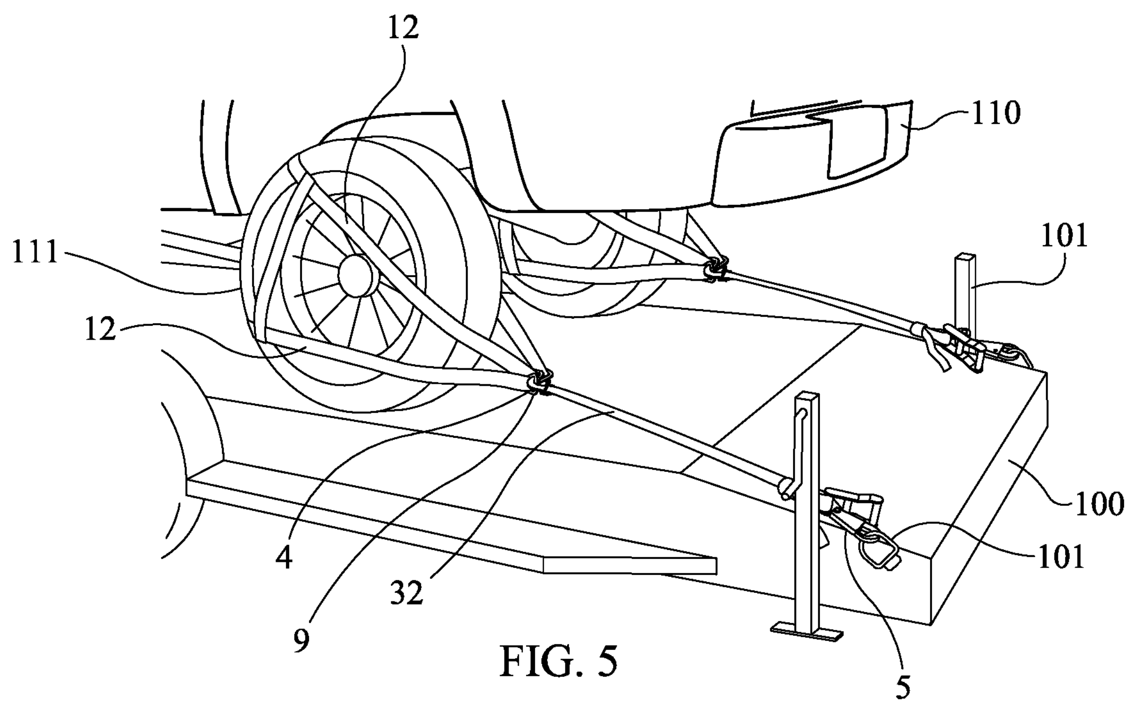
FIG. 5 is a photograph showing a left rear perspective view of the second strap and a third strap according to the invention in which the second strap is securing the rear driver-side tire to the bed of the transport and the third strap is securing the rear passenger-side tire to the bed of the transport.
Figure 6:
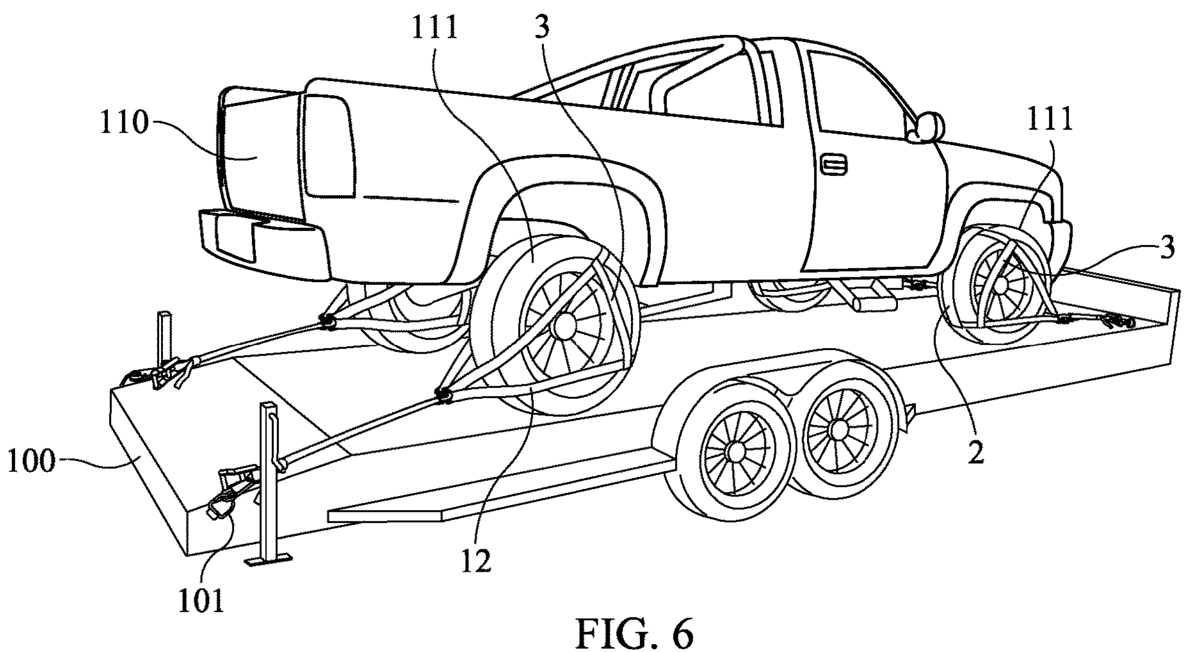
FIG. 6 is a photograph showing a right rear perspective view of the second strap, the third strap, and a fourth strap according to the invention in which the second strap secures the rear driver-side tire to the bed of the transport, the third strap secures the rear passenger-side tire to the bed of the transport, and the fourth strap secures the front passenger-side tire to the bed of the transport.
Figure 7:
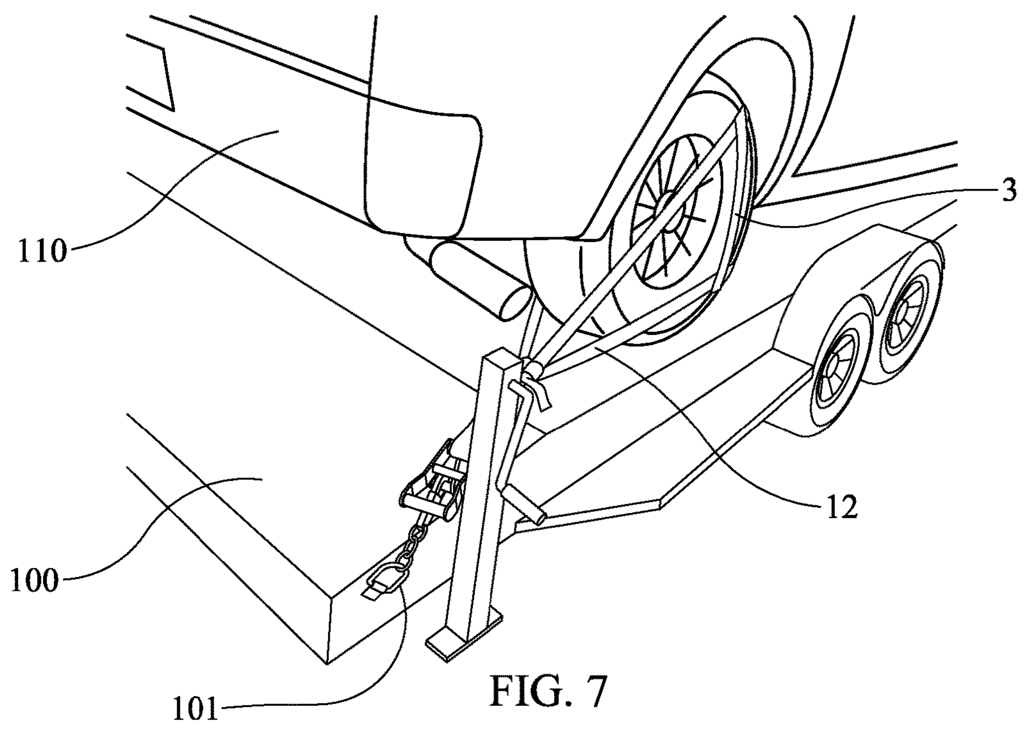
FIG. 7 is a photograph showing a right rear perspective view of the third strap in which the third strap secures the rear passenger-side tire to the bed of the transport.
Figure 8:
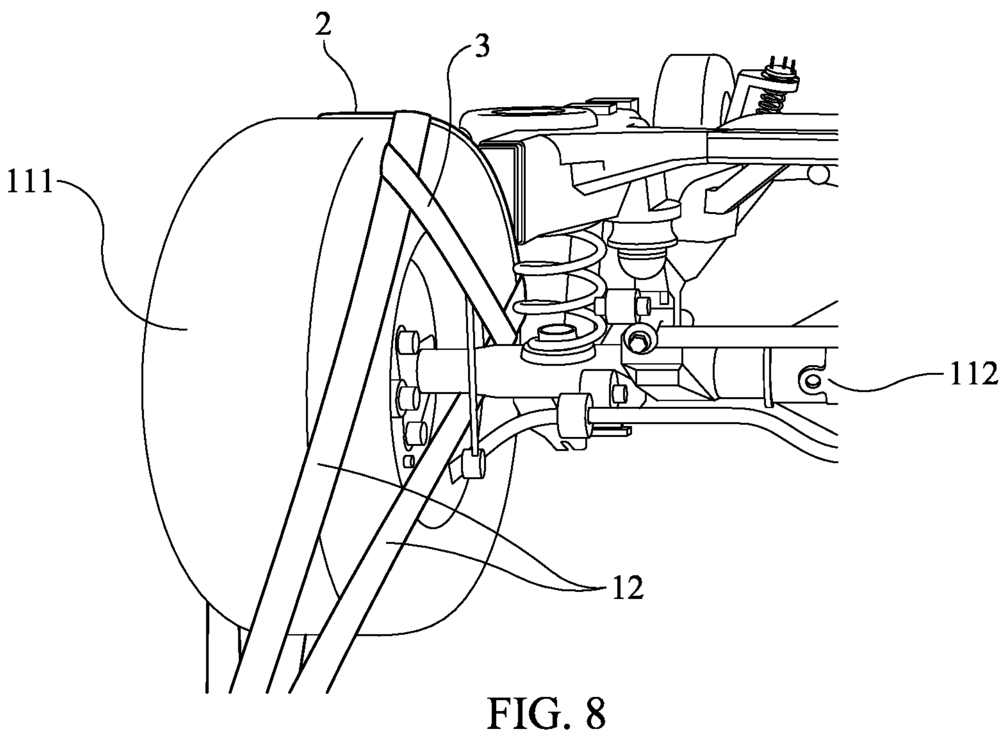
FIG. 8 is a computer-generated image showing a front left perspective view of an inner side of the front-passenger-side tire and the fourth strap according to the invention, in which the fourth strap is securing the front passenger-side tire.

FIG. 1C shows a preferred embodiment of a connecting segment 33. The connecting segment 33 includes a connector arm 6. A flat hook 5, as shown in FIG. 1D, is connected to one end of the connector arm 6. A handle ratchet 20, as shown in FIG. 1E, is connected to the other end of the connector arm 6. A strap organizer 7 with a hook and loop fastener is connected to the connector arm. The end 8A of the tensioning arm 8 that is not connected to the safety hook 9 is fed into the handle ratchet 20.

Figure 9:
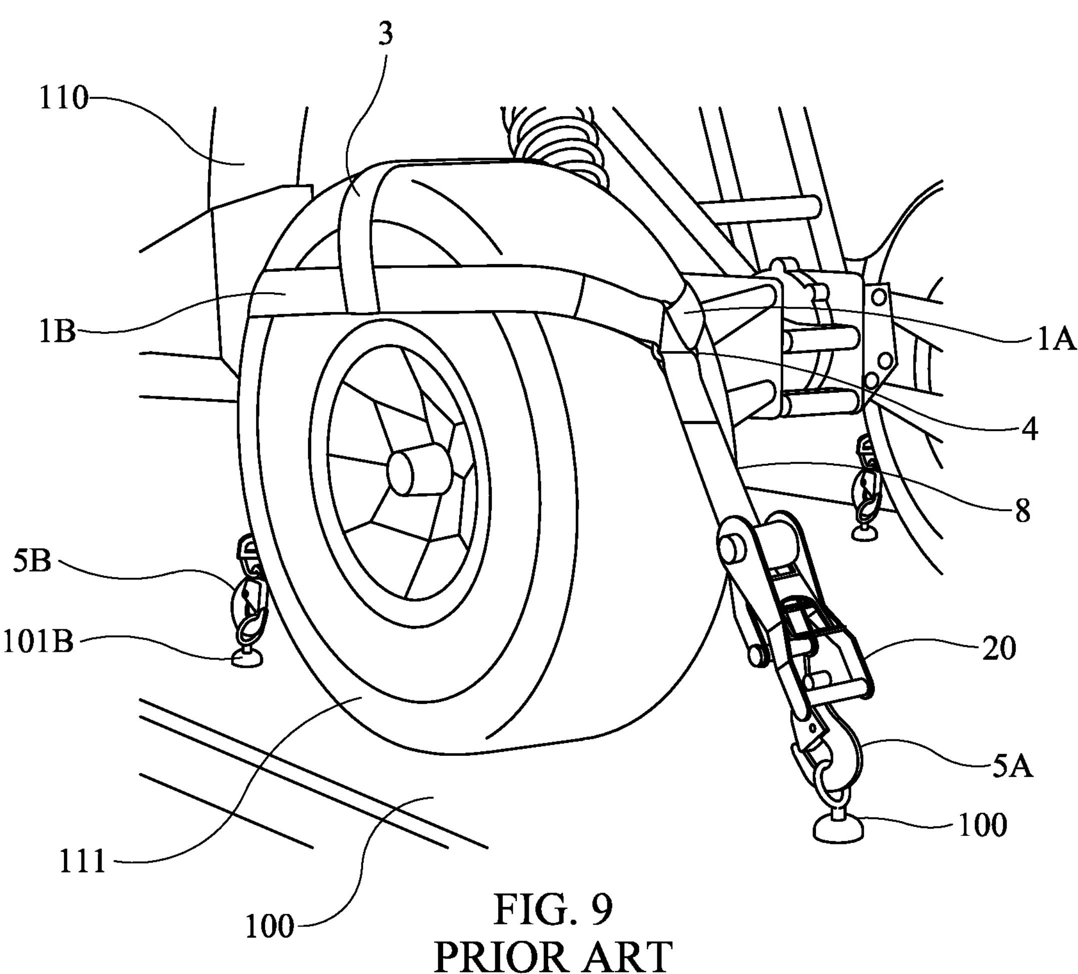
FIG. 9 is a photograph showing a rear left perspective view of a strap according to the prior art in which the strap is securing a front driver-side tire to a bed of a transport.

FIGS. 2-8 show a preferred embodiment of the strap securing a vehicle 110 to a bed 100 of a transport. The bed has a tiedown 101 located at each corner of the bed 100. The tread arm 2 is placed over the tread of the tire 111. The outer support arm 3 is placed on the outer surface of the tire 111. The inner support arm 3 is place on the inner surface of the tire 111. As shown in FIG. 9, the inner two of the outer segments 12 are on opposing sides of the axle 112. The four D-rings 4 connected to the outer segments 12 are secured by the safety hook 9. The flat hook 5 is connected to its respective tie-down 101 and the tensioning segment 32 and connecting segment 33 are tensioned with the handle ratchet 20.

To use the strap, the tread arm 2 is placed over the tread of a tire 111. Two outer segments 12 are placed on the inside of the tire 111 with one outer segment 12 is placed on either side of the axle 112 of the vehicle. Two outer segments 12 are placed on an outer surface of the tire. A first support arm 3 is placed on the inside of the tire 111 and a second support arm is placed on the outside of the tire. The D-rings 4 at the end of each of the four outer segments 12 are gathered and connected to the safety hook 9. The flat hook 5 is connected to the tiedown 101. The strap is tensioned by using the handle ratchet 20.

Figure 10:
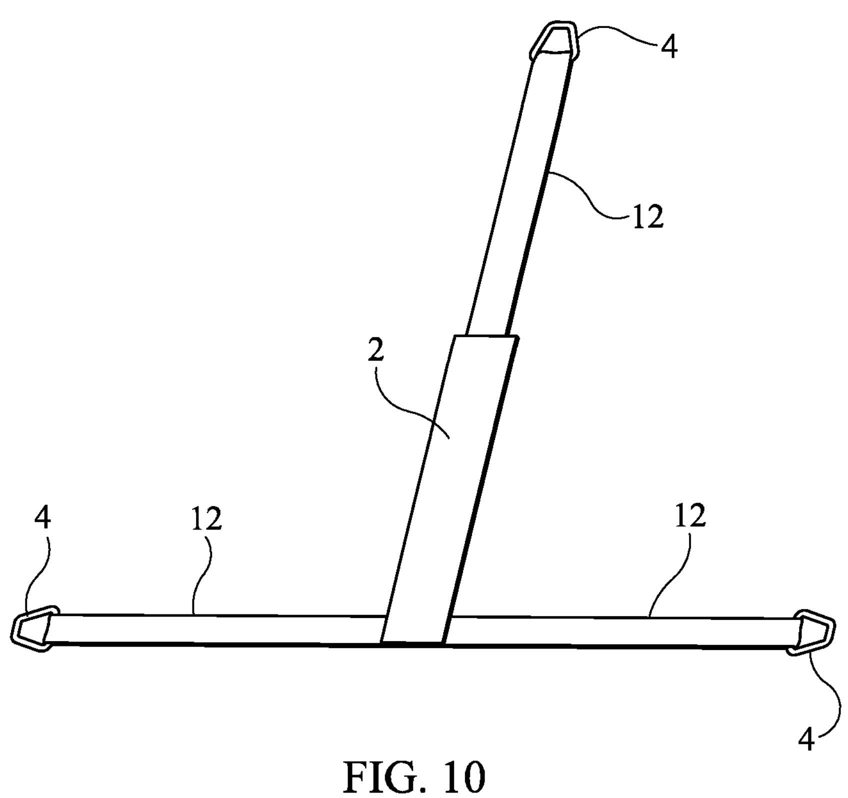
FIG. 10 is a top side view of a second embodiment of a strap.
Figures 11, 12:
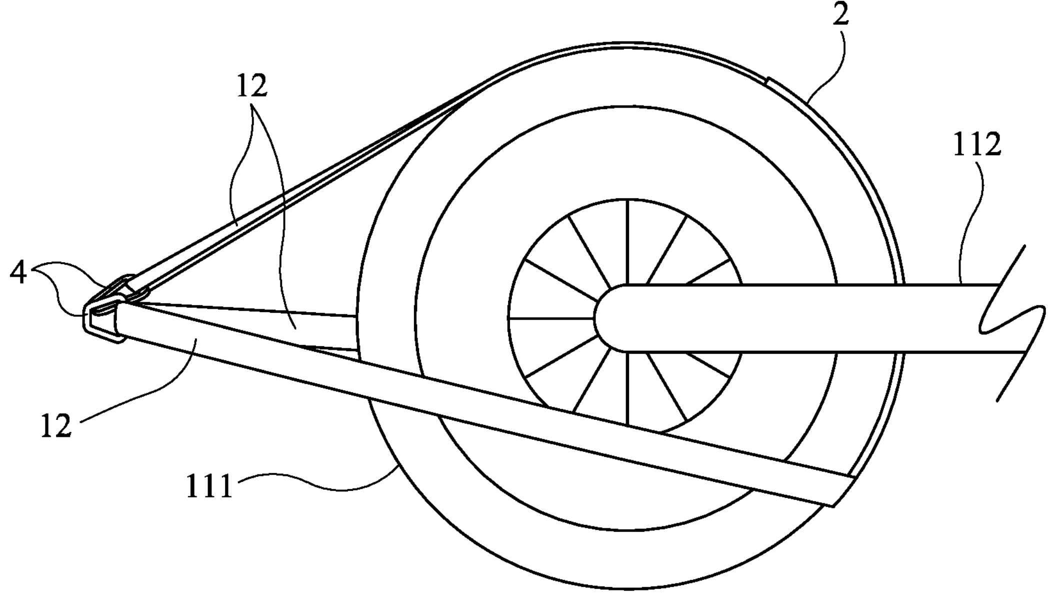
FIG. 11 is a front left perspective view of a tire secured with the second embodiment of the strap shown in FIG. 10.
FIG. 12 is a rear right perspective view of the tire secured with the second embodiment of the strap shown in FIG. 11.
Figure 13:
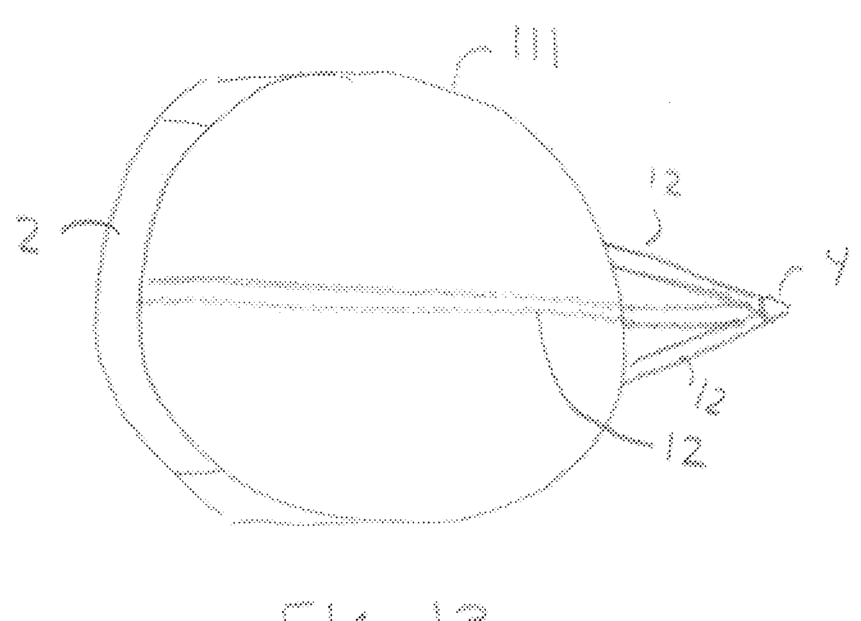

FIGS. 10-12 show a second preferred embodiment of the strap. The strap includes a tread arm 2 that lies on the tread of a tire 111. Two opposing outer segments 12 extend from a first end of the tread arm 2. A third outer segment 12 extends from a second end of the tread arm 2. Each outer segment 12 has a D-ring 4 on its end.

To use the embodiment of the strap shown in FIGS. 10-12, the tread arm 2 is placed on tread surface of the tire 111. The two opposing outer segments 12 are placed on the inner surface of the tire 111 on opposing sides of the axle 112. The third outer segment 12 is placed on the outer surface of the tire. The D-rings 4 are gathered and then tensioning arm with hooks, which are not shown, are used to connect the strap to the tie-down.

What is claimed is:

1. A strap assembly for holding a tire of a vehicle being transported, comprising:
- a tensioning segment; and
- a securing segment, including:
  - a first support arm for placing over an outer face of the tire, said first support arm having a first end and a second end;
  - a second support arm for placing over an inner face of the tire, said second support arm having a first end and a second end;
  - a first outer segment being connected to said first end of said first support arm;
  - a second outer segment being connected to said second end of said first support arm;
  - a third outer segment being connected to said first end of said second support arm;
  - a fourth outer segment being connected to said second end of said second support arm;
  - a first inner segment being connected to said first end of said first support arm;
  - a second inner segment being connected to said second end of said first support arm;
  - a third inner segment being connected to said first end of said second support arm, said third inner segment being further connected to said first inner segment;
  - a fourth inner segment being connected to said second end of said second support arm, said fourth inner segment being further connected to said second inner segment;
  - a first fastener being directly connected to said first outer segment, said first fastener being releasably connected to said tensioning segment;
  - a second fastener being directly connected to said second outer segment, said second fastener being releasably connected to said tensioning segment;
  - a third fastener being directly connected to said third outer segment, said third fastener being releasably connected to said tensioning segment;
  - a fourth fastener being directly connected to said fourth outer segment, said fourth fastener being releasably connected to said tensioning segment; and
  - a tread arm for overlying a tread of the tire, said tread arm having a first end and a second end, said first end of said tread arm being connected to said first inner segment and said third inner segment, and said second end of said tread arm being connected to said second inner segment and said fourth inner segment.

2. The strap assembly according to claim 1, wherein said first support arm and said second support arm are parallel to each other.

3. The strap assembly according to claim 1, wherein:
- said first inner segment is flexible;
- said second inner segment is flexible;
- said third inner segment is flexible; and
- said fourth inner segment is flexible.

4. The strap assembly according to claim 1, wherein at least one of said first support arm, said second support arm, said first outer segment, said second outer segment, said third outer segment, said fourth outer segment, said first inner segment, said second inner segment, said third inner segment, and said fourth inner segment is formed from webbing.

5. The strap assembly according to claim 1, wherein at least one of said first fastener, said second fastener, said third fastener, and said fourth fastener is a ring.

6. The strap assembly according to claim 5, wherein said ring is a D-ring.

7. The strap assembly according to claim 1, wherein:
- said third inner segment has a length less than a radius of the tire; and
- said fourth inner segment has a length less than a radius of the tire.

8. The strap assembly according to claim 1, wherein:
- said first support arm is parallel to said second support arm when unfolded; and
- said first support arm and said second support arm are parallel to said tread arm when unfolded.

9. The strap assembly according to claim 1, wherein said tread arm has a height, said height of said tread arm being greater than a diameter of an axle connected to the tire.

10. The strap assembly according to claim 1, wherein said tread arm has a width, said width of said tread arm being approximately equal to a width of the tread of the tire.

11. The strap assembly according to claim 1, wherein said tensioning segment includes:
- a tensioning arm having a first end and a second end;
- said first end of said tensioning arm being releasably connected to said first fastener, said second fastener, said third fastener, and said fourth fastener.

12. The strap assembly according to claim 11, wherein:
- said tensioning arm includes a fastener;
- said first end of said tensioning arm is connected to said fastener; and
- said fastener is releasably connected to said first fastener, said second fastener, said third fastener, and said fourth fastener.

13. The strap assembly according to claim 12, wherein said fastener is a hook.

14. The strap assembly according to claim 13, wherein said hook is a safety hook having a spring-loaded shackle latch.

15. The strap assembly according to claim 11, further comprising:

a connecting segment; and a tensioner interconnecting said tensioning segment and said connecting segment.

16. A method for securing a tire of a vehicle to a bed of a transport, which comprises:

providing the strap assembly according to claim 1;

detaching said first outer segment and said third outer segment from said tensioning segment;

placing said securing segment over the tire by placing said first support arm over the outer face of the tire, by placing the second support arm over the inner face of the tire with the second support arm being above an axle connected to the tire, by placing at least a portion of said first inner segment over a tread of the tire, by placing at least a portion of said second inner segment over the tread of the tire, by placing at least a portion of said third inner segment over the tread of the tire, and by placing at least a portion of said fourth inner segment over the tread of the tire;

passing said first outer segment over an axle of the vehicle;

passing said third outer segment under the axle of the vehicle;

releasably attaching said first outer segment to said tensioning segment with said first outer segment being over the axle; and releasably attaching said third outer segment to said tensioning segment with said third outer segment being under the axle.

17. The method according to claim 16, which further comprises:

after placing said securing segment, securing a first end of a strap to said first fastener, said second fastener, said third fastener, and said fourth fastener of said securing segment; and securing a second end of said strap to the bed of the transport.

18. The method according to claim 17, which further comprises, after securing said first end and said second end of said strap, tensioning said strap.

* * * * *